(12) United States Patent
Gore et al.

(10) Patent No.: US 11,502,571 B2
(45) Date of Patent: Nov. 15, 2022

(54) LOCKING WEDGE SYSTEM HAVING OPPOSING WEDGES WITH INTERLOCKING DETENT

(71) Applicant: Siemens Energy, Inc., Orlando, FL (US)

(72) Inventors: Robert Gore, Sorrento, FL (US); Shane Bell, Chuluota, FL (US)

(73) Assignee: Siemens Energy, Inc., Orlando, FL (US)

(*) Notice: Subject to any disclaimer, the term of this patent is extended or adjusted under 35 U.S.C. 154(b) by 73 days.

(21) Appl. No.: 16/990,614

(22) Filed: Aug. 11, 2020

(65) Prior Publication Data
US 2022/0052574 A1 Feb. 17, 2022

(51) Int. Cl.
*H02K 3/48* (2006.01)
*H02K 3/487* (2006.01)
*H02K 15/00* (2006.01)

(52) U.S. Cl.
CPC ......... *H02K 3/487* (2013.01); *H02K 15/0018* (2013.01)

(58) Field of Classification Search
CPC ...... H02K 1/18; H02K 15/0018; H02K 3/487; H02K 2213/09; H02K 3/50; H02K 3/52; H02K 3/521; H02K 3/505; H02K 3/527; H02K 3/46; H02K 3/48; H02K 3/522
See application file for complete search history.

(56) References Cited

U.S. PATENT DOCUMENTS

| 2001/0013736 A1* | 8/2001 | Blakelock | H02K 3/487 310/214 |
| 2012/0049697 A1* | 3/2012 | Andarawis | G01L 5/0057 310/68 B |
| 2018/0287448 A1* | 10/2018 | Sanjuan | H02K 3/487 |

* cited by examiner

*Primary Examiner* — Leda T Pham

(57) ABSTRACT

A locking wedge system for securing a stator coil in a slot of a stator core includes a slot layer positioned on the stator coil to inhibit movement of the stator coil within the slot, an outer wedge including a first tapered surface, an inner locking wedge positioned on the slot layer, the inner locking wedge including a second tapered face that interfaces with the first tapered face, a locking member configured to lock the inner locking wedge to the stator core, and an interlocking mechanism to couple the outer wedge to the inner locking wedge.

6 Claims, 5 Drawing Sheets

LOCKING WEDGE SYSTEM HAVING OPPOSING WEDGES WITH INTERLOCKING DETENT

BACKGROUND

Generator stator wedge systems are used to hold stator coils in place in the stator core. Within a given stator slot, the wedge system is located in the outside diameter of the slot and is comprised of multiple wedge segments oriented end to end longitudinally along special grooves in the stator core. It is desired that the end wedges of the wedge train in a given slot have a mechanism to lock the wedges in place in the stator core.

BRIEF SUMMARY

In an embodiment, a locking wedge system for securing a stator coil in a slot of a stator core includes a slot layer positioned on the stator coil to inhibit movement of the stator coil within the slot, an outer wedge including a first tapered surface, an inner locking wedge positioned on the slot layer, the inner locking wedge including a second tapered face that interfaces with the first tapered face, a locking member configured to lock the inner locking wedge to the stator core, and an interlocking mechanism to couple the outer wedge to the inner locking wedge.

In another embodiment, a locking wedge system for securing a stator coil in a slot of a stator core includes an outer wedge including a first tapered face, the first tapered face with a triangular wedge protrusion, an inner locking wedge including a corresponding second tapered face that interfaces with the first tapered face, the second tapered face including an oval shaped recess, the triangular wedge protrusion interlocks with the oval shaped recess, and a locking member configured to lock the outer wedge/inner locking wedge to the stator core.

In a further embodiment, a method of securing a stator coil within a slot of a stator core includes positioning an inner locking wedge including a locking wedge tapered face and a plurality of ears protruding from an end portion of the locking wedge so that the plurality of ears are positioned in a radial stator vent of the stator cores radially outward of a slot layer positioned over a stator coil, sliding an outer wedge into a wedge groove in the slot, interfacing a tapered face of the upper wedge with the locking wedge tapered face, and interlocking a protrusion on the upper wedge with a recess in the inner locking wedge.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
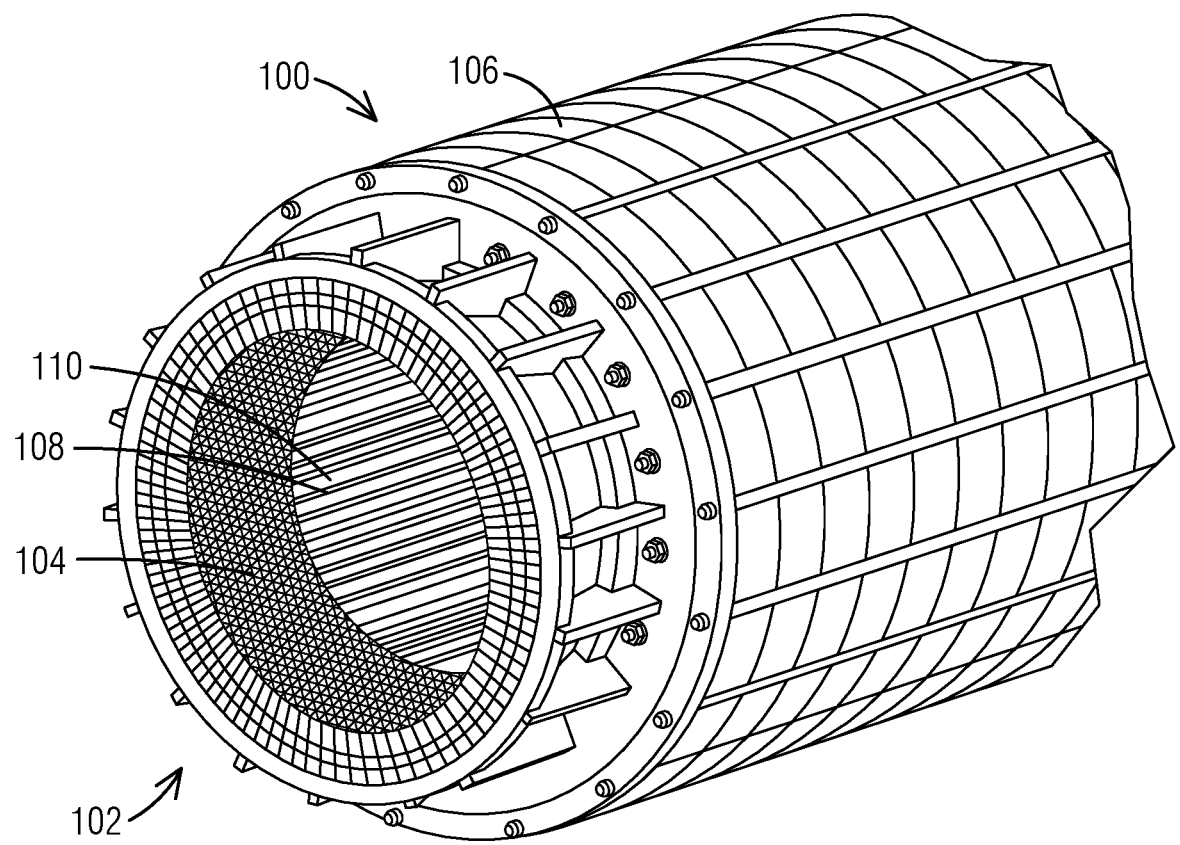
FIG. 1 is a cut-away, perspective view of a stator core for a high voltage generator.

FIG. 1 is a cut-away perspective view of a stator core 100 for a high voltage generator, wherein the stator core 100 is shown separated from an inner frame of the generator. An end unit 102 is mounted to each end of a stack of stator packs 106, wherein the end unit 102 and the stator pack 106 define an internal bore 104 in which a rotor (not shown) is positioned in a manner well understood by those skilled in the art. The stator packs 106 each include a plurality of laminate plate rings which are stamped to define a series of stator core teeth 108 defining slots 110 in which stator coils are provided as part of the stator core 100.

Figure 2:
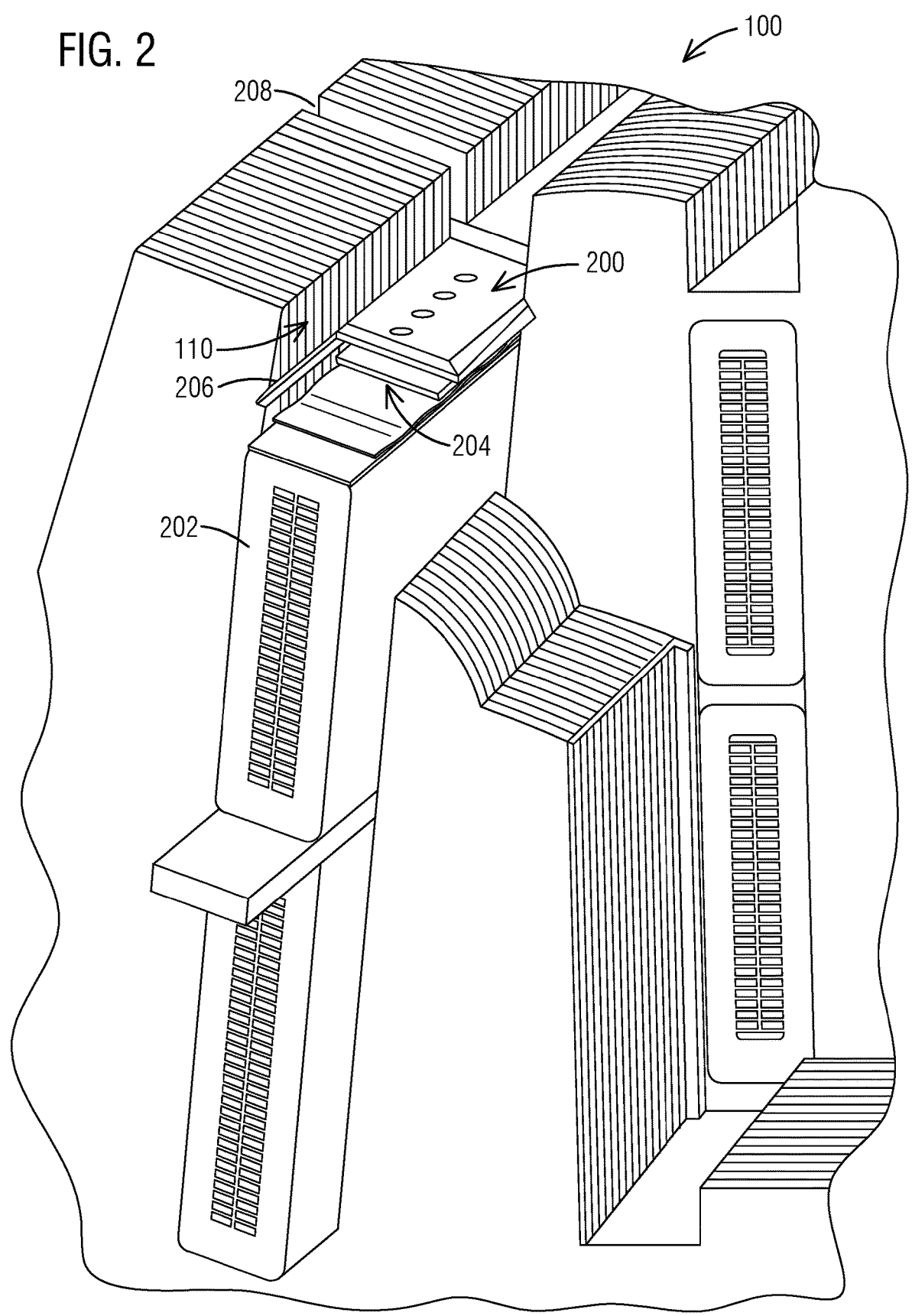
FIG. 2 is a perspective view of a locking wedge system.

FIG. 2 is a perspective view of the stator core 100 having a cut away view of a locking wedge system 200 according to an embodiment. The stator core 100 includes one or more slots 110 which extend axially along a longitudinal direction of the stator core 100. For example, FIG. 2 illustrates a portion of one of the slots formed by the stacked stator laminations. One or more stator coils 202 may be placed within the slot 110. A slot layer 204, which may comprise several filler layers, is positioned on each stator coil 202 in order to inhibit movement of the stator coil 202 in the slot 110. Included in the filler layers may be a spring member. A locking wedge system 200 may be placed at the axial end of the slot 110 on the slot layer 204 engaged with wedge grooves 206 on side walls of the slots 110. In order to inhibit the movement of the stator coil 202 and hold it in place, it is desired for the locking wedge system 200 and the slot layer 204 to evenly distribute the radial load onto the stator coil 202.

Figure 3:
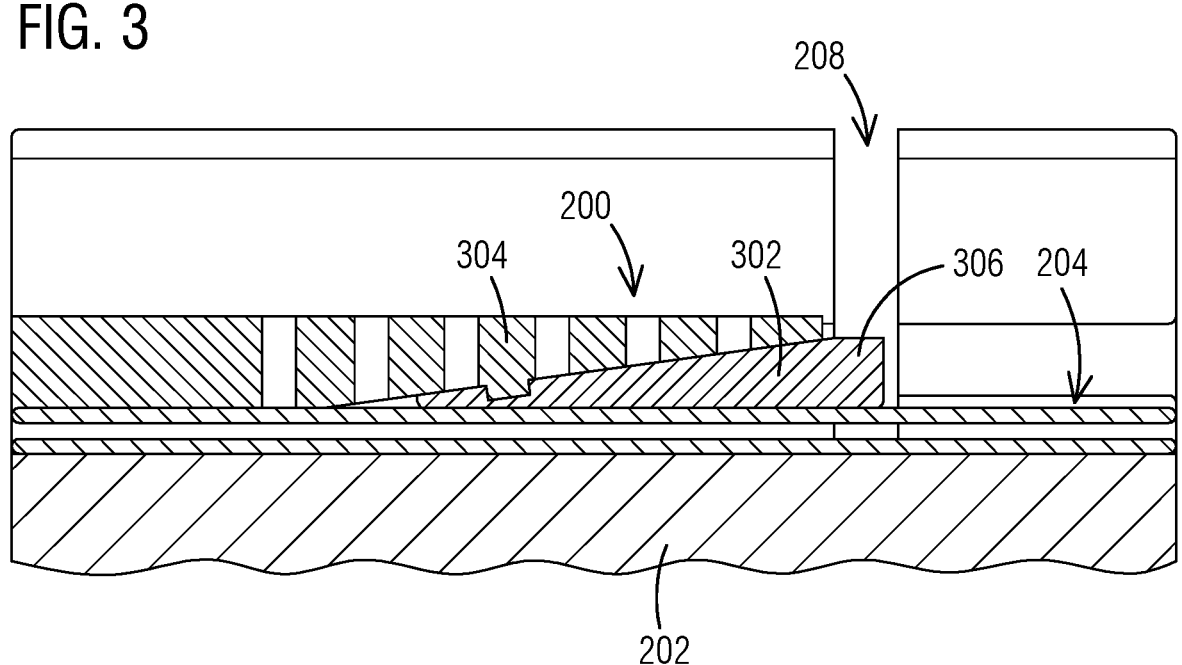
FIG. 3 is an aspect of the subject matter in accordance with one embodiment.

FIG. 3 is a cross sectional view of the locking wedge system 200 for the stator core 100. The locking wedge system 200 may include a set of opposing wedge portions. The set of opposing wedge portions may include an inner locking wedge 302 and an outer wedge 304. The outer wedge 304 includes a first tapered face and the inner locking wedge 302 includes a second tapered face that interfaces with the first tapered face. The inner locking wedge 302 may be positioned on the slot layer 204 so that a face opposite the second tapered face is coplanar with the slot layer 204. The outer wedge 304 may be positioned radially outward, with regards to the stator core 100, from the inner locking wedge 302 so that the second tapered face interfaces with the first tapered face.

The set of opposing wedges may include an interlocking mechanism to interlock the outer wedge 304 and the inner locking wedge 302. In an embodiment, the interlocking mechanism includes a protrusion on the first tapered face and a recess on the second tapered face so that the protrusion interlocks with the recess when the first tapered face and the second tapered face interface.

Figure 4:
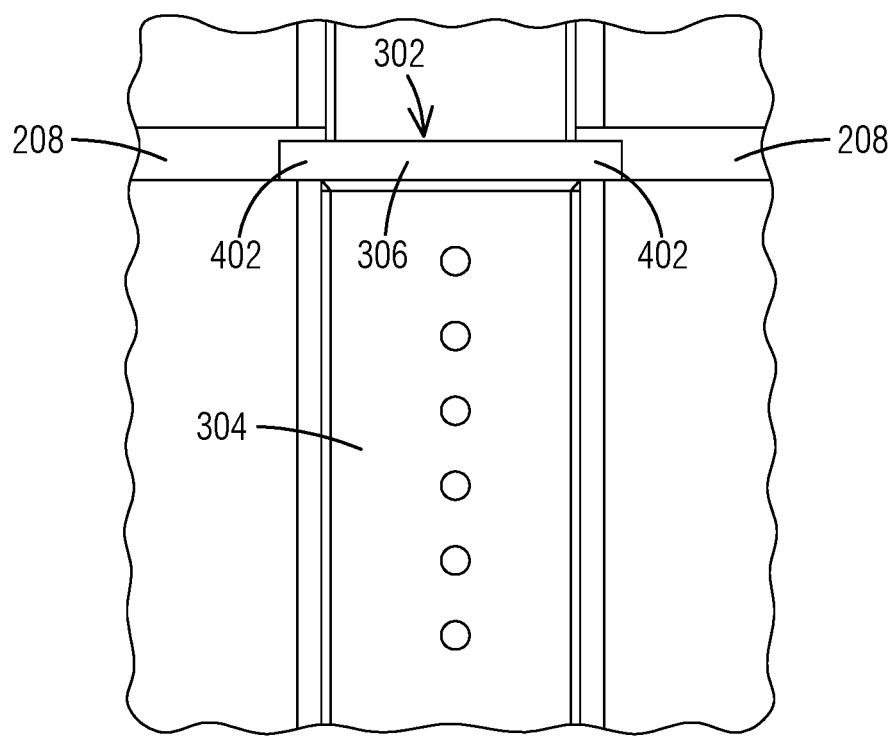
FIG. 4 is a top view of the locking wedge system.

The locking wedge system 200 may include a locking member 306 that locks the locking wedge system 200 to the stator core 100. In the embodiment shown in FIG. 3 and FIG. 4, the locking member 306 is integral with the inner locking wedge 302. The locking member 306 may comprise one or more ears 402 that protrude from an end portion of the inner locking wedge 302. The plurality of ears 402, as shown in FIG. 4, may be positioned to extend within a radial stator vent 208 in the stator core 100 locking the inner locking wedge 302 to the stator core 100. This may be seen in FIG. 4 which shows a top view of the locking wedge system 200 and illustrates the end portion of the inner locking wedge 302 and the plurality of ears 402 extending within the radial stator vent 208.

Figure 5:
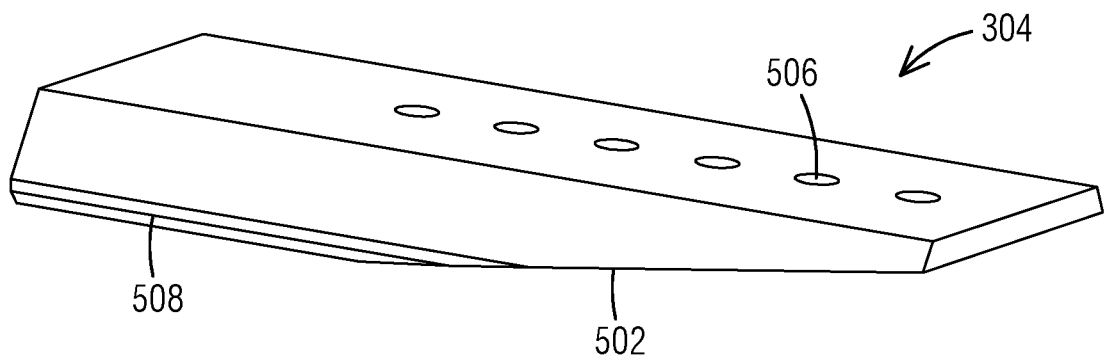
FIG. 5 is a perspective view of the outer wedge.
Figure 6:
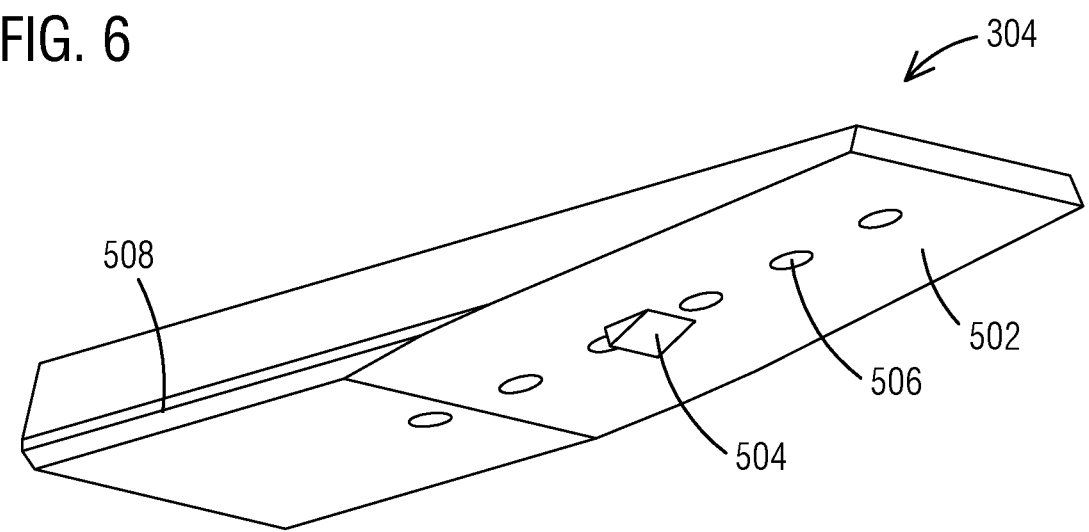
FIG. 6 is a further perspective view of the outer wedge.

FIGS. 5 and 6 illustrate two perspective views of the outer wedge 304. The view shown in FIG. 6 shows the first tapered face 502 of the outer wedge 304. The angle of the taper may vary while still corresponding to that of the second tapered face of the inner locking wedge 302. This view also shows the outer wedge 304 including a protrusion 504 on the first tapered face. In the shown embodiment, the protrusion 504 is in the shape of a triangular prism. The shape of the protrusion 504 is configured to interlock with a recess on the second tapered face.

In an embodiment, the inner locking wedge 302 is displaceable away from the outer wedge 304 to disengage the inner locking wedge 302 from the outer wedge 304. In the shown embodiment, the outer wedge 304 includes a plurality of through holes 506. The plurality of through holes 506 extend through a face of the outer wedge 304 opposite the first tapered face 502 through to the first tapered face 502. The through holes 506 may enable a tool to unlock the set of opposing wedges after being locked by the interlocking mechanism by inserting the tool into and through a hole of the through holes 506 and pushing the tool against the inner locking wedge 302 to disengage the protrusion 504 from the recess.

The outer wedge 304 may also include a plurality of fins 508 each extending out from a side face of the outer wedge 304. The fins 508 slide into wedge grooves 206 in the slot 110 for radially positioning and holding the set of opposing wedges within the slot 110.

Figure 7:
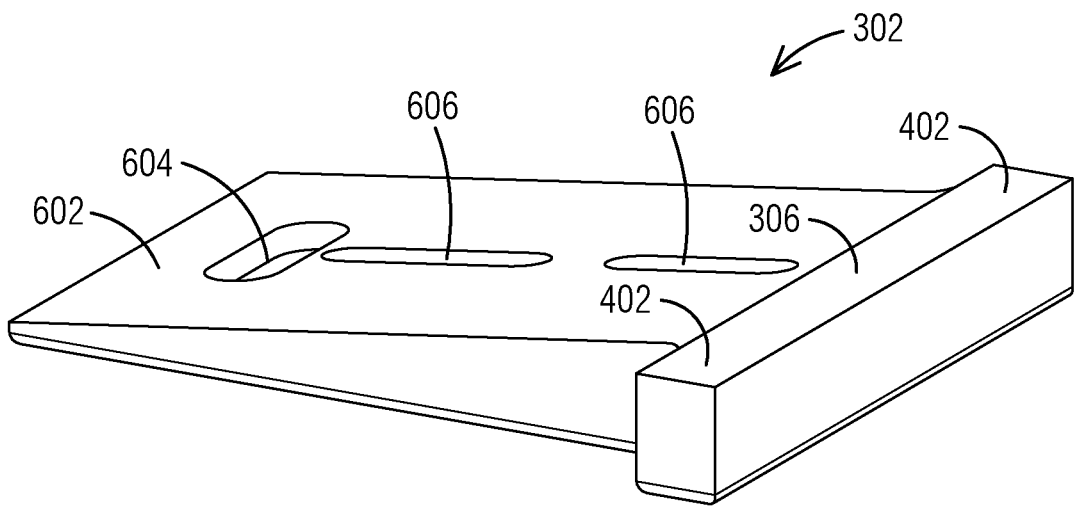
FIG. 7 is a perspective view of the inner locking wedge.
Figure 8:
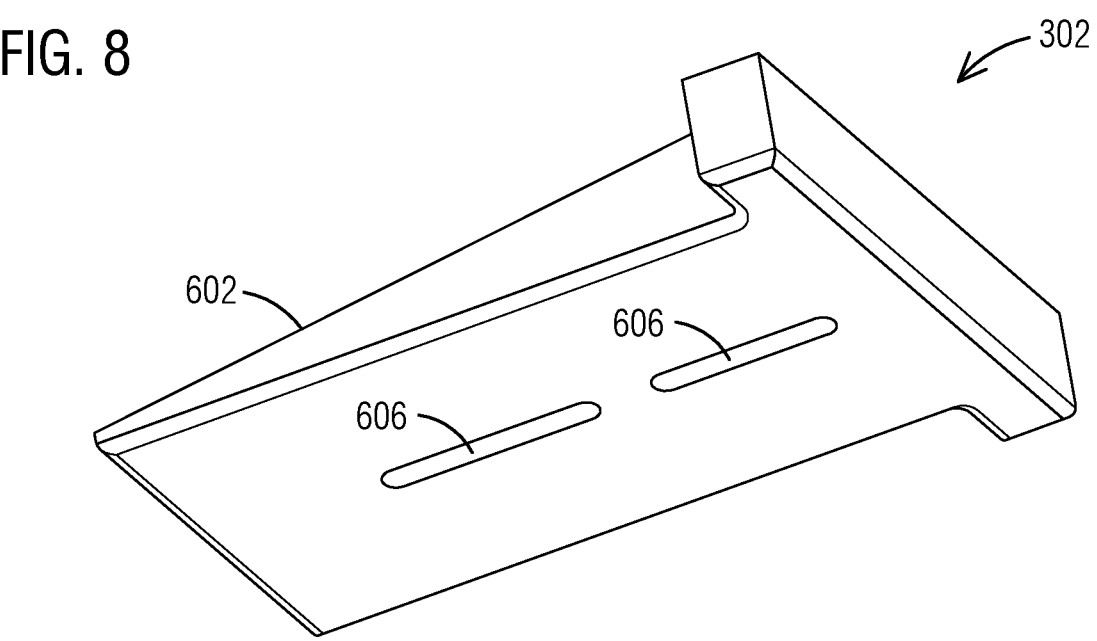
FIG. 8 is a further perspective view of the inner locking wedge.

FIGS. 7 and 8 illustrate two perspective views of the inner locking wedge 302. The view of FIG. 7 illustrates the second tapered face 602 of the inner locking wedge 302. As with the first tapered face 502, the angle of the taper may vary while still corresponding to that of the first tapered face 502. The view of FIG. 7 includes a recess 604 in the second tapered face 602. The protrusion 504 and recess 604 are configured so that the protrusion 504 can interlock with the recess 604 and inhibit movement between the outer wedge 304 and the inner locking wedge 302. Oblong slots 606 may be included in the inner locking wedge 302 to allow access for compression measurements on the spring member located underneath the inner locking wedge 302 as part of the slot layer 204.

As discussed above, the inner locking wedge 302 may include a locking member 306. In the shown embodiment, the locking member 306 includes the plurality of ears 402 protruding from an end portion of the inner locking wedge 302. The ears 402 extend within the radial stator vent 208 in the slot 110 locking the inner locking wedge 302 to the stator core 100.

In an embodiment, the locking wedge system 200 may be installed by placing the inner locking wedge 302 in the proper location so that the ears 402 extend within the radial stator vent 208 in the slot 110 of the stator core 100 and sliding the fins 508 of the outer wedge 304 into the wedge grooves 206 of the slot until the protrusion 504 interlocks in the recess 604. In order to uninstall the locking wedge system 200, a tool, such as a pin, may be utilized. The pin may be inserted into one of the through holes 506 and pushed against the inner locking wedge 302 to disengage the protrusion 504 from the recess 604.

While the examples shown in FIGS. 1-8 illustrate a locking wedge system having a corresponding detent protrusion and recess, the described locking wedge system may utilize various positive mechanical interlocking schemes. For example, a repeated ramped profile on each of the opposing wedges may be utilized that interlocked when mated.

The locking wedge system may be installed without special tools and does not necessitate any clamping or significant deflection of the wedge system during installation or operation. The locking wedge system components may be installed by placing the inner locking wedge in the proper location in the stator core and sliding the coupled wedge in the wedge grooves until the protrusion and the recess interlock. The system may be disassembled utilizing a pin, for example, to push the lock down, unlocking the opposing wedges. Thus, as no damage is done to the locking wedge system during disassembly, it may be reused.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A locking wedge system for securing a stator coil in a slot of a stator core, comprising:
    an outer wedge including a first tapered face, the first tapered face with a triangular wedge protrusion, and
    an inner locking wedge including a corresponding second tapered face that interfaces with the first tapered face, the second tapered face including an oval shaped recess, wherein the triangular wedge protrusion interlocks with the oval shaped recess; and
    a locking member configured to lock the outer wedge/inner locking wedge to the stator core.

2. The locking wedge system of claim 1, wherein the locking member further includes an ear that protrudes from an end portion of the inner locking wedge, and wherein the ear extends within a radial stator vent of the stator core to lock the inner locking wedge within the slot.

3. The locking wedge system of claim 2, wherein the inner locking wedge provides an even pressure on a slot layer disposed between a stator coil and the locking wedge system over a length of the locking wedge system.

4. A method of securing a stator coil within a slot of a stator core, comprising:
    positioning an inner locking wedge including a locking wedge tapered face and a plurality of ears protruding from an end portion of the inner locking wedge so that the plurality of ears are positioned in a radial stator vent of the stator core radially outward of a slot layer positioned over a stator coil; and
    sliding an outer wedge into at least one wedge groove in the slot;
    interfacing a tapered face of the outer wedge with the locking wedge tapered face; and
    interlocking a triangular wedge protrusion on the tapered face of the outer wedge with an oval recess in the locking wedge tapered face.

5. The method of claim 4, further comprising providing an even pressure on the slot layer by the inner locking wedge over a length of the inner locking wedge.

6. The method of claim 4, further comprising:
inserting a tool into a hole in the outer wedge; and
pushing the tool against the inner locking wedge to disengage the triangular wedge protrusion from the oval recess unlocking a set of opposing wedges.

* * * * *